(12) United States Patent
Bell et al.

(10) Patent No.: US 10,170,088 B2
(45) Date of Patent: Jan. 1, 2019

(54) COMPUTING DEVICE WITH TOUCHSCREEN INTERFACE FOR NOTE ENTRY

(71) Applicant: International Business Machines Corporation, Armonk, NY (US)

(72) Inventors: Denise A. Bell, Austin, TX (US); Karthik Pallapothu, Evanston, IL (US); Minh Q. Pham, Austin, TX (US); Ronald J. Theriault, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 15/435,992

(22) Filed: Feb. 17, 2017

(65) Prior Publication Data

US 2018/0240446 A1    Aug. 23, 2018

(51) Int. Cl.
| G10H 1/00 | (2006.01) |
| G10H 1/18 | (2006.01) |
| G06F 3/0488 | (2013.01) |
| G06F 3/041 | (2006.01) |

(52) U.S. Cl.
CPC ........... *G10H 1/0008* (2013.01); *G06F 3/041* (2013.01); *G06F 3/04883* (2013.01); *G06F 2203/04105* (2013.01); *G10H 2220/096* (2013.01); *G10H 2220/126* (2013.01)

(58) Field of Classification Search
CPC .......... G10H 1/0008; G10H 2220/096; G10H 2220/126; G06F 3/041; G06F 3/04883; G06F 2203/04105

USPC .......................................................... 84/615
See application file for complete search history.

(56) References Cited

U.S. PATENT DOCUMENTS

| 5,369,217 | A | 11/1994 | Yamashita et al. |
| 7,739,595 | B2 | 6/2010 | Salter |
| 8,717,303 | B2 | 5/2014 | Ludwig |
| 9,082,380 | B1 * | 7/2015 | Hamilton ............... G10H 1/368 |
| 9,620,095 | B1 * | 4/2017 | Hamilton ............... G10H 1/368 |
| 9,640,160 | B2 * | 5/2017 | Wang |
| 9,666,173 | B2 * | 5/2017 | Lee .......................... G10H 1/34 |

(Continued)

FOREIGN PATENT DOCUMENTS

KR    101370547 B1    3/2014

OTHER PUBLICATIONS

"Microsoft announces Surface Book laptop with 13.5 inch display starting at $1,499", Jacob Kastrenakes, TheVerge.com, Oct. 6, 2015.*

(Continued)

*Primary Examiner* — Jeffrey Donels
(74) *Attorney, Agent, or Firm* — Cantor Colburn LLP; Joe Petrokaitis (57) ABSTRACT

A computing device is provided. The computing device includes a touchscreen, a speaker configured to output sounds corresponding to the musical notes and a processor. The processor defines an area of the touchscreen as a note timing entry region and a remainder of the touchscreen as an interface region. The processor also records a timing of user taps in the note timing entry region and controls the speaker to output the sounds corresponding to the musical notes in the sequence in accordance with the timing of the user taps.

12 Claims, 4 Drawing Sheets

(56) References Cited

U.S. PATENT DOCUMENTS

| | | | |
|---|---|---|---|
| 9,761,209 B2* | 9/2017 | Cook | G10H 1/0016 |
| 2011/0134061 A1* | 6/2011 | Lim | G06F 3/016 |
| | | | 345/173 |
| 2011/0146477 A1 | 6/2011 | Tsukamoto | |
| 2011/0283866 A1 | 11/2011 | Hogan | |
| 2011/0316793 A1* | 12/2011 | Fushiki | G06F 3/04886 |
| | | | 345/173 |
| 2012/0071994 A1* | 3/2012 | Lengeling | G06F 3/04886 |
| | | | 700/94 |
| 2012/0079410 A1* | 3/2012 | Adam | G06F 3/04886 |
| | | | 715/773 |
| 2013/0152767 A1* | 6/2013 | Katz | G10H 1/00 |
| | | | 84/616 |
| 2014/0083279 A1* | 3/2014 | Little | G10H 1/0008 |
| | | | 84/609 |
| 2015/0221297 A1 | 8/2015 | Buskies et al. | |
| 2015/0310844 A1 | 10/2015 | Little et al. | |
| 2016/0175718 A1* | 6/2016 | Yoo | A63F 13/814 |
| | | | 463/35 |

OTHER PUBLICATIONS

Anonymous, "Brute Force Technology: Zen Piano for iPhone "Senses" Tap Pressure, But Not by Magic", 2009, retrieved online URL<: http://cdm.link/2009/05/brute-force-technology-zen-piano-for-iphone-senses-tap-pressure-but-not-by-magic>, 9 pages.

* cited by examiner

Time

FIG. 5

Time

FIG. 6

Time

COMPUTING DEVICE WITH TOUCHSCREEN INTERFACE FOR NOTE ENTRY

BACKGROUND

The present invention relates to computing devices and, more particularly, to computing devices with touchscreen interfaces by which musical notes can be entered.

A touchscreen is an important input and output tool of a computing device and is normally layered on the top of an electronic visual display of an information processing system. A user can give input or control the information processing system through simple or multi-touch gestures by touching the screen with a special stylus and/or one or more fingers. Some touchscreens are operated using ordinary or specially coated gloves while others require the use of a special stylus/pen only. In any case, the user can use the touchscreen to react to what is displayed and to control how it is displayed. For example, the user can do a reverse pinch to zoom into graphics to increase text sizes.

A touchpad, trackpad or mousepad is a pointing device featuring a tactile sensor, a specialized surface that can translate the motion and position of a user's fingers to a relative position on the operating system that is outputted to the screen. Touchpads are a common feature of laptop computers, and are also used as a substitute for a mouse where desk space is scarce. Because they vary in size, they can also be found on personal digital assistants (PDAs) and some portable media players. Wireless touchpads are also available as detached accessories.

For a user who wishes to enter musical notes into or to manipulate musical notes already stored in a memory unit of a computing device, such actions commonly involve the use of a keyboard or some other traditional musical device. The device may be simulated on a touch screen or not. In either case, a good deal of skill is required in order to hit the correct notes in the correct order and with the correct timing.

SUMMARY

According to an embodiment of the present invention, a computing device is provided. The computing device includes a touchscreen, a speaker or other audio transducer configured to output sounds corresponding to the musical notes and a processor. The processor defines an area of the touchscreen as a note timing entry region and a remainder of the touchscreen as an interface region. The processor also records a timing of user taps in the note timing entry region and controls the speaker to output the sounds corresponding to the musical notes in the sequence in accordance with the timing of the user taps.

According to another embodiment of the present invention, a computing device is provided. The computing device includes a touchscreen, a memory unit having executable instructions and a sequence of musical notes stored thereon, a speaker configured to output sounds corresponding to the musical notes and a processor. The processor is operative when the executable instructions are executed to define an area of the touchscreen as a note timing entry region and a remainder of the touchscreen as an interface region, to record a timing of user taps in the note timing entry region and to control the speaker to output the sounds corresponding to the musical notes in the sequence in accordance with the timing of the user taps.

According to yet another embodiment of the present invention, a method of operating a computing device is provided. The computing device includes a touchscreen, a speaker and a memory unit having a sequence of musical notes stored thereon. The method includes defining an area of the touchscreen as a note timing entry region, defining a remainder of the touchscreen as an interface region, recording a timing of user taps in the note timing entry region and controlling the speaker to output the sounds corresponding to the musical notes in the sequence in accordance with the timing of the user taps.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, the creation of musical passages is simplified by providing for a separation between the entering of note data and the entering of note timing data to thereby allowing unskilled people to create sophisticated musical passages. In addition, the present disclosure provides for customization of the rhythmic nature of a sequence of notes and may be used in the live presentation or playing of a sequence of notes. An unskilled user can also use the features described herein to experiment with the rhythm of a note sequence recreationally, possibly engendering a greater interest in music.

Figure 1:
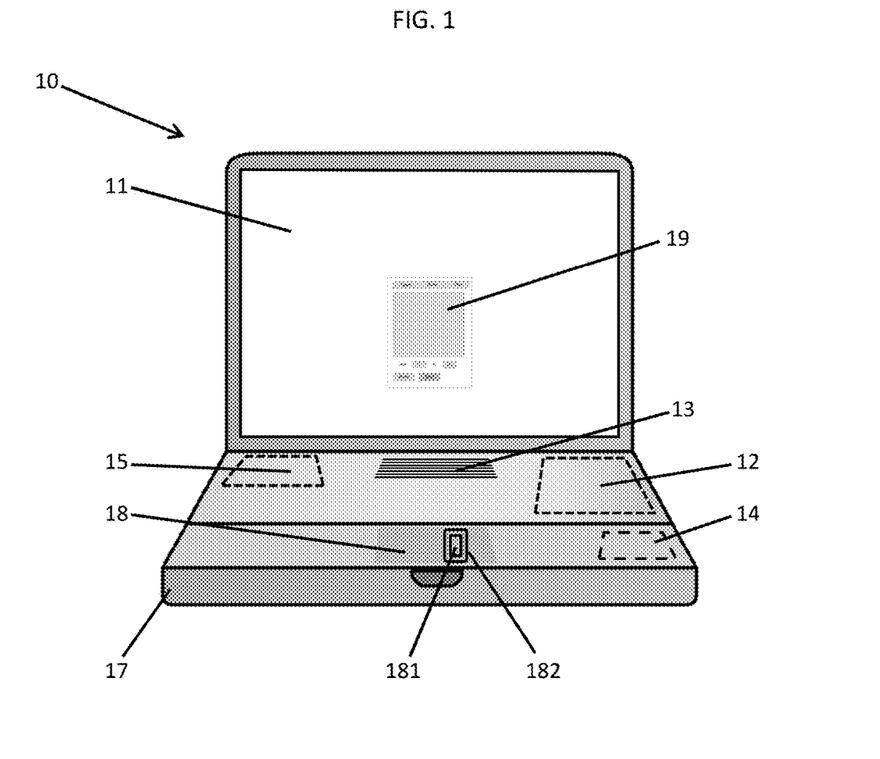
FIG. 1 is a perspective view of a computing device provided as a laptop in accordance with embodiments.
Figure 2:
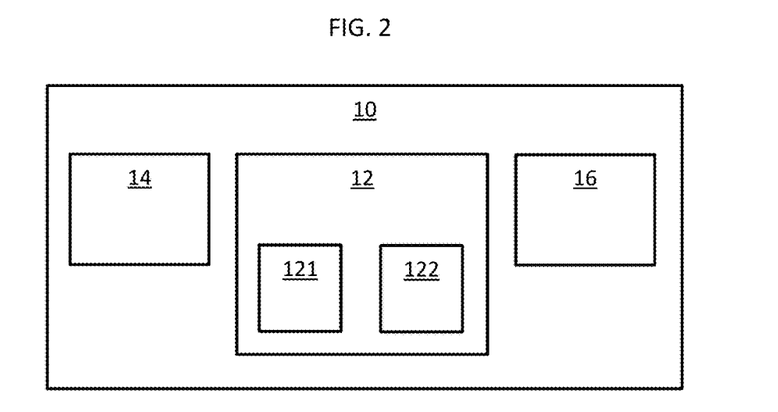
FIG. 2 is a schematic illustration of components of the computing device of FIG. 1.

With reference to FIGS. 1 and 2, a computing device 10 is provided. The computing device 10 includes a touchscreen 11, a memory unit 12, a speaker 13 and a processor 14. The memory unit 12 may include a read-only memory (ROM) section 121 having executable instructions stored thereon, and a ROM or random access memory (RAM) section 122 having one or more sequences of musical notes stored thereon. For purposes of clarity and brevity, the following disclosure will relate to the case in which the ROM or RAM section 122 is provided as a RAM section 122 and has a sequence of musical notes stored thereon. The speaker 13 is configured to output sounds corresponding to the musical notes.

The computing device 10 further includes a power source 15, which may be provided as a rechargeable battery or as an external power source, a networking unit 16 by which the computing device 10 is communicative with other computing devices and a housing 17. The housing 17 is configured to support the touchscreen 11 and to house the memory unit 12, the speaker 13, the processor 14, the power source 15 and the networking unit 16. The computing device 10 may further include an input element, such as a keyboard that could be provided as hardware supported on the housing 17 or as a graphical element displayed in the touchscreen 11 or a trackpad 18 that could be supported on the housing 17.

As shown in FIG. 1, the computing device 10 may be provided as desktop computing device or as a portable computing device. In the latter case, the computing device 10 may be a laptop, a tablet or a smartphone, for example. For purposes of clarity and brevity, the following description will relate to the case in which the computing device 10 is provided as a portable laptop with the touchscreen 11 and the trackpad 18.

The processor 14 may be provided as a central processing unit (CPU), for example, and is operative when the executable instructions of the ROM section 121 are executed to perform certain actions. These include, but are not limited to, displaying an application specific, graphical user interface (GUI) 19 on the touchscreen 11 whereby a user can input commands and receive an output via the touchscreen 11. The GUI 19 will be described in greater detail below. The actions of the processor 14 further include defining a first area of the touchscreen 11 as a note timing entry region 110 (see FIG. 3) and a second area or a remainder of the touchscreen 11 as an interface region 111 (see FIG. 3), recording a timing of user taps in the note timing entry region 110 and controlling the speaker 13 to output the sounds corresponding to the musical notes in the sequence in accordance with the timing of the user taps.

The touchscreen 11 may be any type of touchscreen, including, but not limited to, a resistive type, a surface acoustic wave type, a capacitive type, an infrared (IR) grid type, an IR acrylic projection type, an optical imaging type, a dispersive signal technology type, an acoustic pulse recognition type, any other type of combinations thereof. In any case, the touchscreen 11 can be controlled by the processor 14 to display the GUI 19 and may be interacted with by touch by a user. Such interactions can be single-finger or multiple-finger interactions, for example. In both the single-finger and multiple-finger interactions, the touchscreen 11 is configured to sense a location of each individual one of the interactions, a duration of each individual one of the interactions and, in some cases, a pressure of each individual one of the interactions.

Figure 3:
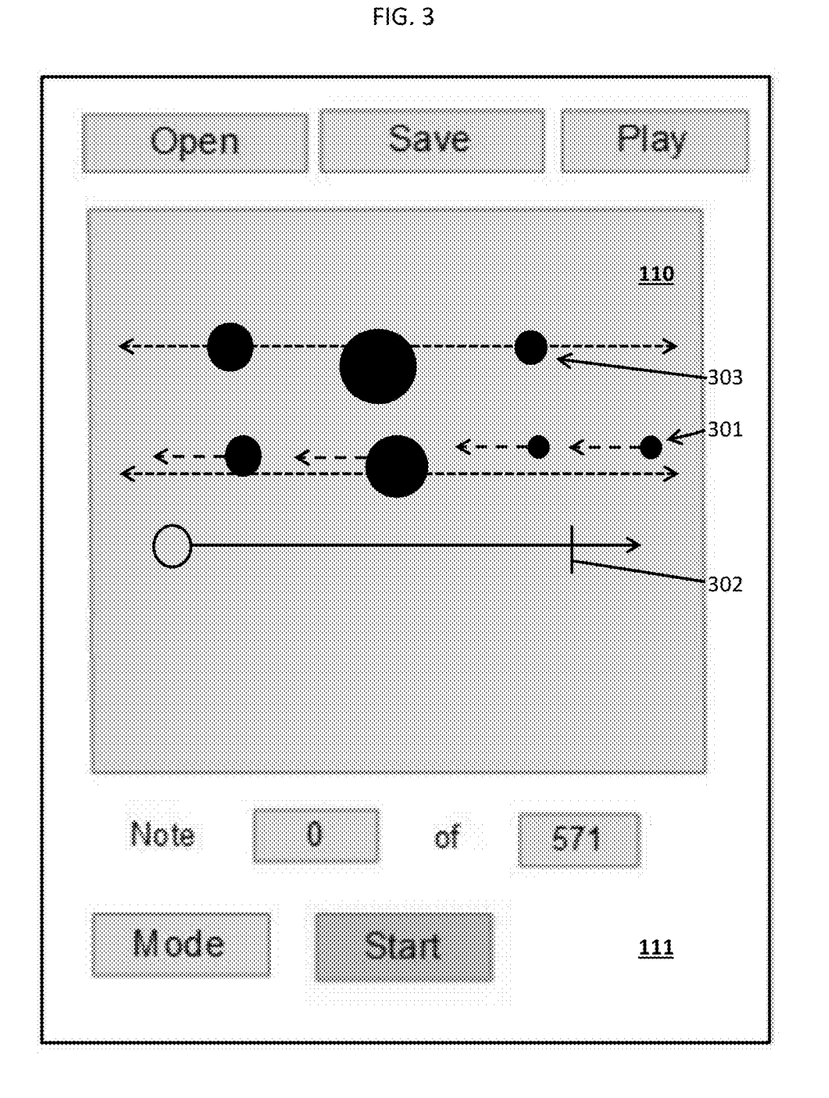
FIG. 3 is an illustration of an exemplary graphical user interface for supporting the creating of musical passages in accordance with embodiments.

In accordance with embodiments and with reference to FIG. 3, the GUI 19 includes the note timing entry region 110 and a perimeter surrounding the note timing entry region 110 that serves as the interface region 111. Within the interface region 111, the three buttons at the top allow for reading, saving and playing of encoded or non-encoded musical or sound files and the row beginning with the "Note" identifier is used to inform the user of which note in a music or sound file will be played when a tap in the note timing entry region 110 is next tapped. The "Start" button can be configured such that when it is pressed or clicked, the note timing entry region 110 turns color or is highlighted to indicate that editing is in progress. The "Start" button turns red at this point and becomes a "Stop" button. Each tap in the note timing entry region 110 will be associated with the playing of a note from a recorded note sequence until either all notes are played or the "Stop" button is pressed. The note timing entry region 110 is provided as the large area in the center of the GUI 19 and is the region where a user taps to specify note timing, spacing and optionally duration and volume and pitch. That is, during the executions of the executable instructions by the processor 14, the user may tap his finger(s) in the note timing entry region 110 of the touchscreen 11 so as to input note timing commands into the GUI 19.

The trackpad 18 may be supportively disposed on the housing 17 and acts as a pointing device. In accordance with embodiments, the trackpad 18 includes a tactile sensor provided as a specialized surface that can be associated with the touchscreen 11 in terms of position and size and can sense touch by and motion of a user's finger(s). The processor 14 is configured to cause touchscreen 11 to display a cursor that is positioned according to the locations of the user's finger(s) on the trackpad 18 and which is movable according to the movement of the user's finger(s) on the trackpad 18.

Thus, during the executions of the executable instructions, the note timing entry region 110 and the interface region 111 of the touchscreen 11 may be associated with corresponding first and second regions of the trackpad 181 and 182 (see FIG. 1), respectively. As such, during the executions of the executable instructions by the processor 14, the user may tap his finger(s) in the first region 181 of the trackpad 18 that is associated with the note timing entry region 110 of the touchscreen 11 so as to input note timing commands into the GUI 19.

Figure 4:
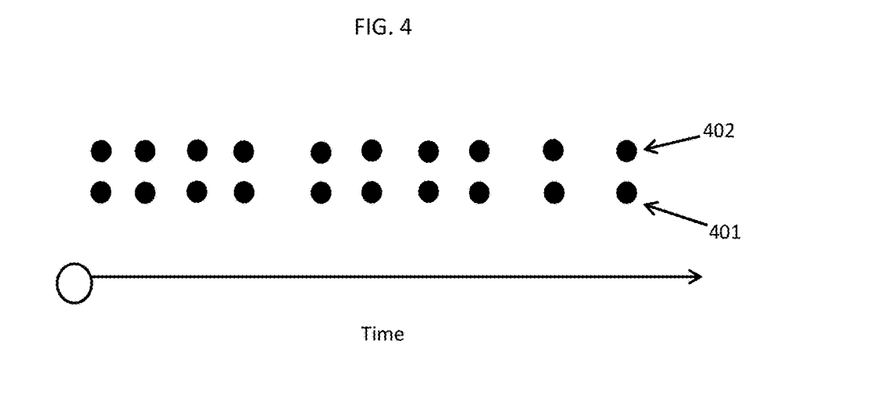
FIG. 4 is a graphical representation of user taps and outputted sounds in accordance with embodiments.

With reference to FIG. 4, the processor 14 may control the speaker to output the sounds of the notes each user tap is associated with such that the timing of the sound output is substantially coincident with the user taps. That is, the timing of the user taps is illustrated as a first series of tap dots 401, which is plotted along a timing axis, and the timing of the outputted sounds is illustrated as a second series of sound dots 402, which is similarly plotted along the timing axis. As shown in FIG. 4, the timing of the tap dots 401 and the timing of the sound dots 402 is substantially similar and indicates that the sounds of the notes are output almost at a same time as the user taps. Of course, it is to be understood that the timing of the user taps can be recorded for playback at a later time as well.

Figure 5:
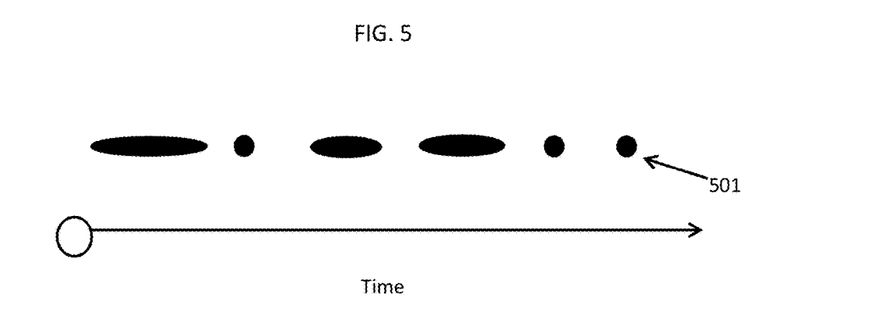
FIG. 5 is a graphical representation of user taps and outputted sounds in accordance with embodiments.

With reference to FIG. 5, the processor 14 may control the speaker to output the sounds of the notes each user tap is associated with such that the duration of the sound output is defined in accordance with the durations of each of the user taps. That is, the duration of each of the user taps is illustrated in the series of tap dots 501, which are plotted along a timing axis. By recording such durations, the processor 14 can control the speaker 13 to output the sounds with substantially similar or equal durations.

Figure 6:
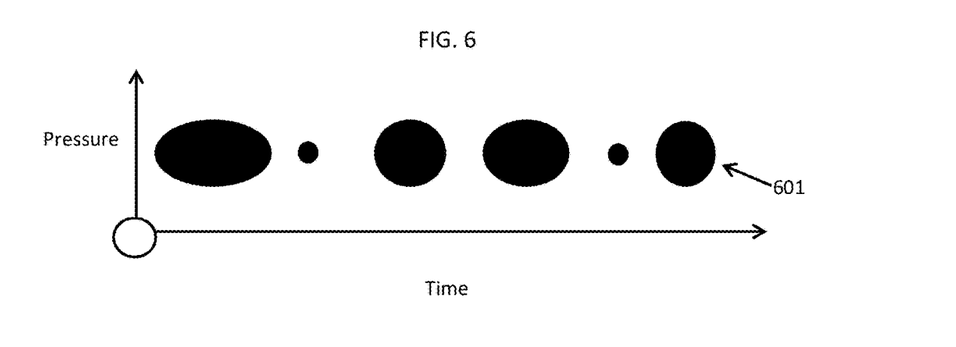
FIG. 6 is a graphical representation of user taps and outputted sounds in accordance with embodiments.

With reference to FIG. 6, the processor 14 may control the speaker to output the sounds of the notes each user tap is associated with such that the volume of the sound output is defined in accordance with the pressure applied by the user to the touchscreen 11 or the trackpad 18 at each of the user taps. That is, the pressure of each of the user taps is illustrated in the series of tap dots 601, which are plotted along a timing axis and along a pressure axis. By recording such pressures, the processor 14 can control the speaker 13 to output the sounds with substantially corresponding volumes.

In accordance with embodiments and with reference back to FIG. 3, the processor 14 may be further configured to display recommendations for the timing of the user taps so that the resulting timing for the playing of the sequence of notes is accurate to achieve a desired sonic effect. Such recommendations may, for example, take the form of a scrolling sequence of dots 301 that eventually pass by a notch 302 in the timing axis. The moment when each dot 301 passes by the notch 302 is representative of when the note timing entry region 110 of the touchscreen 11 should be tapped by the user for the associated note. Moreover, the processor 14 may record and display deviations between the recommendations for the timing of the user taps and the actual timing of the user taps, which can be represented as tap dots 303, so that the user can observe his progress and accuracy.

In accordance with further embodiments, the processor may be further configured to display additional or alternative recommendations for one or more of the duration, pressure and scale location (i.e., scale location relative to a baseline) of the user taps. Such additional or alternative recommendations would be associated with one or more of the duration, volume and pitch of the sounds that should be output by the speaker in order to achieve the desired sonic effect and can be provided as graphical information along with the dots 301. As above, the processor 14 may record and display deviations between the additional or alternative recommendations and one or more of the duration, pressure and scale location of the user taps in the tap dots 303 so that the user can observe his progress and accuracy.

Figure 7:
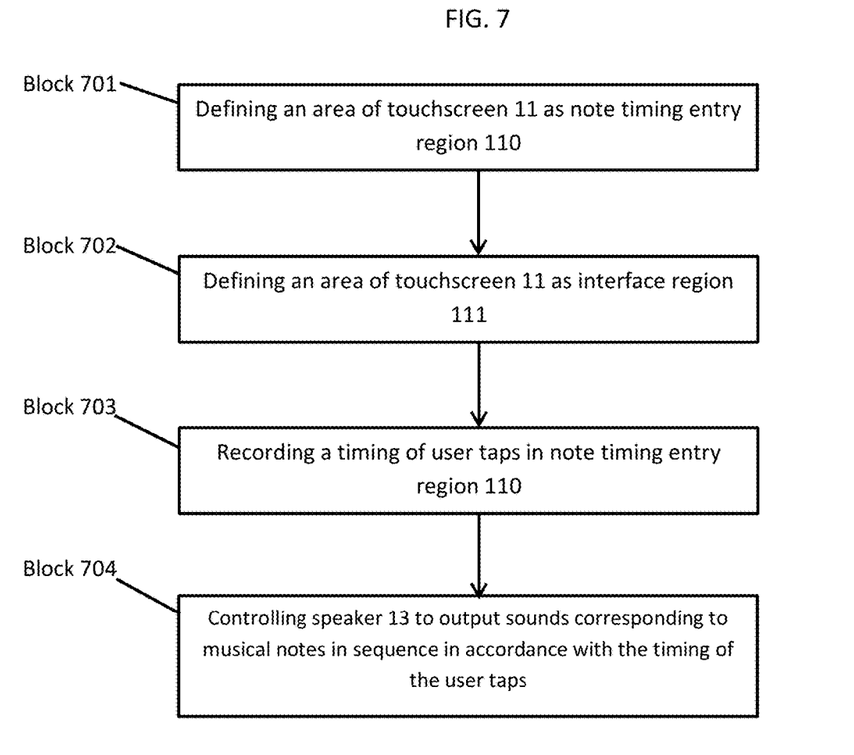
FIG. 7 is a flow diagram illustrating a method of operating a computing device comprising a touchscreen, a speaker and a memory unit having a sequence of musical notes stored thereon.

With reference to FIG. 7, a method of operating a computing device 10 as described above is provided. The computing device 10 includes at least the touchscreen 11, the memory unit 12 and the speaker 13 with a sequence of musical notes stored in the memory unit 12. The method includes defining an area of the touchscreen 11 as the note timing entry region 110 (block 701), defining a remainder of the touchscreen 11 as an interface region 111 (block 702), recording a timing of user taps in the note timing entry region 110 (block 703) and controlling the speaker 13 to output the sounds corresponding to the musical notes in the sequence in accordance with the timing of the user taps (block 704). In accordance with embodiments, as mentioned above, the controlling of block 704 may include outputting the sounds with a timing such that the sounds are substantially coincident with the user taps (at least to the extent that the computing device 10 as a whole is capable of executing sound output in real- or nearly real-time).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computing device, comprising:
a touchscreen;
a speaker configured to output sounds corresponding to musical notes; and
a processor to define an area of the touchscreen as a note timing entry region and a remainder of the touchscreen as an interface region,
wherein the computing device further comprises:
a housing supportive of the touchscreen, the speaker and the processor and which is configured as a portable laptop computer; and
a trackpad supported on the housing with a surface remote from the touchscreen and having first and second areas respectively corresponding to the note timing entry region and the interface region,
wherein the processor is configured to record a timing of user taps in the note timing entry region of the touchscreen and the first area of the surface of the trackpad and to control the speaker to output the sounds corresponding to the musical notes in a sequence in accordance with the timing of the user taps,
wherein the processor displays recommendations for durations, pressures and scale locations of the user taps and records and displays deviations between the recommendations and the durations, the pressures and the scale locations of the user taps, the scale locations of the user taps being defined relative to a baseline.

2. The computing device according to claim 1, wherein the outputting of the sounds is substantially coincident with the user taps.

3. The computing device according to claim 1, wherein the processor records durations of each of the user taps in the note timing entry region and controls the speaker to output the sounds for respective durations in accordance with the recorded durations.

4. The computing device according to claim 1, wherein the processor records pressures of each of the user taps in the note timing entry region and controls the speaker to output the sounds at respective volumes in accordance with the pressures.

5. A computing device, comprising:
a touchscreen;
a memory unit having executable instructions and a sequence of musical notes stored thereon;
a speaker configured to output sounds corresponding to the musical notes; and
a processor which is operative when the executable instructions are executed to define an area of the touchscreen as a note timing entry region and a remainder of the touchscreen as an interface region,
wherein the computing device further comprises:
a housing supportive of the touchscreen, the speaker and the processor and which is configured as a portable laptop computer; and
a trackpad supported on the housing with a surface remote from the touchscreen and having first and second areas respectively corresponding to the note timing entry region and the interface region,
wherein the processor is configured to record a timing of user taps in the note timing entry region of the touchscreen and the first area of the surface of the trackpad and to control the speaker to output the sounds corresponding to the musical notes in the sequence in accordance with the timing of the user taps,
wherein the processor displays recommendations for durations, pressures and scale locations of the user taps and records and displays deviations between the recommendations and the durations, the pressures and the scale locations of the user taps, the scale locations of the user taps being defined relative to a baseline.

6. The computing device according to claim 5, wherein the outputting of the sounds is substantially coincident with the user taps.

7. The computing device according to claim 5, wherein the processor is further operative to record durations of each of the user taps in the note timing entry region and to control the speaker to output the sounds for respective durations in accordance with the recorded durations.

8. The computing device according to claim 5, wherein the processor is further operative to record pressures of each of the user taps in the note timing entry region and to control the speaker to output the sounds at respective volumes in accordance with the pressures.

9. A method of operating a computing device,
the computing device comprising a touchscreen, a speaker, a memory unit having executable instructions and a sequence of musical notes stored thereon, a processor, a trackpad with a surface remote from the touchscreen and having first and second areas and a housing supportive of the touchscreen, the speaker, the memory unit, the processor and the trackpad, the executable instructions being executable by the processor such that the processor executes the method of operating the computing device, the method comprising:

defining an area of the touchscreen as a note timing entry region such that the note timing entry region corresponds to the first area of the trackpad;

defining a remainder of the touchscreen as an interface region such that the interface region corresponds to the second area of the trackpad;

recording a timing of user taps in the note timing entry region of the touchscreen and the first area of the trackpad; and controlling the speaker to output sounds corresponding to the musical notes in the sequence in accordance with the timing of the user taps the method further comprising:

displaying recommendations for durations, pressures and scale locations of the user taps, the scale locations of the user taps being defined relative to a baseline; and recording and displaying deviations between the recommendations and the durations, the pressures and the scale locations of the user taps.

10. The method according to claim 9, wherein the controlling comprises outputting the sounds substantially coincident with the user taps.

11. The method according to claim 9, further comprising:

recording durations of each of the user taps in the note timing entry region; and controlling the speaker to output the sounds for respective durations in accordance with the recorded durations.

12. The method according to claim 9, further comprising:

recording pressures of each of the user taps in the note timing entry region; and controlling the speaker to output the sounds at respective volumes in accordance with the pressures.

* * * * *